(12) United States Patent
Venkata et al.

(10) Patent No.: US 9,940,371 B2
(45) Date of Patent: Apr. 10, 2018

(54) METHOD, SYSTEM, AND APPARATUS FOR ARRANGING CONTENT SEARCH RESULTS

(71) Applicant: Nokia Corporation, Espoo (FI)

(72) Inventors: Murali-Krishna Punaganti Venkata, Espoo (FI); Kristian Luoma, Kiviniemi (FI); Jussi-Pekka Partanen, Helsinki (FI); Mikko Kankainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/329,564

(22) Filed: Jul. 11, 2014

(65) Prior Publication Data

US 2014/0337330 A1    Nov. 13, 2014

Related U.S. Application Data

(63) Continuation of application No. 12/209,343, filed on Sep. 12, 2008, now Pat. No. 8,818,992.

(51) Int. Cl.
*G06F 17/30* (2006.01)

(52) U.S. Cl.
CPC .... *G06F 17/30554* (2013.01); *G06F 17/3053* (2013.01); *G06F 17/30867* (2013.01); *G06F 17/30893* (2013.01); *G06F 17/30899* (2013.01)

(58) Field of Classification Search
CPC ........... G06F 17/3053; G06F 17/30893; G06F 17/30867; G06F 17/30554; G06F 17/30899
USPC ........................................................ 707/723
See application file for complete search history.

(56) References Cited

U.S. PATENT DOCUMENTS

| 4,980,829 | A | 12/1990 | Okajima et al. |
| 5,404,299 | A | 4/1995 | Tsurubayashi et al. |
| 5,497,319 | A | 3/1996 | Chong et al. |
| 5,526,259 | A | 6/1996 | Kaji |

(Continued)

FOREIGN PATENT DOCUMENTS

| EP | 0982672 A2 | 3/2000 |
| EP | 0993165 A2 | 4/2000 |

(Continued)

OTHER PUBLICATIONS

International Search Report and Written Opinion of Corresponding International Application No. PCT/FI2009/050719 dated Feb. 5, 2010, pp. 1-19.

(Continued)

*Primary Examiner* — Shahid Alam
(74) *Attorney, Agent, or Firm* — Ditthavong & Steiner, P.C.

(57) ABSTRACT

Content search involves receiving a user-formulated search query via a user device. The search query is submitted to two or more search domains. The search domains represent separate data repositories accessible via the user device. Results objects are received from the two or more search domains in response to the search query. The results objects arc ranked using different ranking criterion by the respective search domains from which the search results were received. A rank value for each of the results objects is determined based on a single ranking criterion. The results objects are ordered based at least in part on the rank values determined using the single ranking criterion and sent for display in a user interface of the user device.

21 Claims, 11 Drawing Sheets

(56) References Cited

U.S. PATENT DOCUMENTS

| | | |
|---|---|---|
| 5,675,815 A | 10/1997 | Yamauchi et al. |
| 5,867,811 A | 2/1999 | O'Donoghue |
| 5,966,685 A | 10/1999 | Flanagan et al. |
| 6,085,162 A | 7/2000 | Cherny |
| 6,112,206 A | 8/2000 | Morris et al. |
| 6,167,450 A | 12/2000 | Angwin et al. |
| 6,275,820 B1 | 8/2001 | Navin-Chandra et al. |
| 6,321,257 B1 | 11/2001 | Kotola et al. |
| 6,339,795 B1 | 1/2002 | Narurkar et al. |
| 6,522,889 B1 | 2/2003 | Aarnio |
| 6,539,384 B1 | 3/2003 | Zellner et al. |
| 6,594,484 B1 | 7/2003 | Hitchings, Jr. |
| 6,647,409 B1 | 11/2003 | Sherman et al. |
| 6,675,202 B1 | 1/2004 | Perttunen |
| 6,985,454 B1 | 1/2006 | Wiedeman et al. |
| 7,130,841 B1 | 10/2006 | Goel et al. |
| 2005/0144162 A1 | 6/2005 | Liang |
| 2005/0165753 A1 | 7/2005 | Chen et al. |
| 2007/0029949 A1 | 2/2007 | Null et al. |
| 2007/0250502 A1 | 10/2007 | Canright et al. |
| 2007/0276829 A1 | 11/2007 | Wang et al. |
| 2008/0005067 A1 | 1/2008 | Dumais et al. |
| 2008/0005068 A1 | 1/2008 | Dumais et al. |
| 2008/0028036 A1* | 1/2008 | Slawson ........... G06F 17/30867 709/217 |
| 2008/0215557 A1 | 9/2008 | Ramer et al. |
| 2008/0294602 A1 | 11/2008 | Permandla et al. |

FOREIGN PATENT DOCUMENTS

| | | |
|---|---|---|
| EP | 0994608 A2 | 4/2000 |
| WO | 9961984 | 12/1999 |

OTHER PUBLICATIONS

Rasolofo Y. et al., "Result Merging Strategies for a Current News Metasearcher", Information Processing and Management 39, 2003, pp. 581-609.

Leavitt N. "Will WAP Deliver the Wireless Internet?" Technology News, May 2000, pp. 16-20.

Extended European Search Report for corresponding European Application No. 09812741.8, dated Aug. 29, 2013, 6 pages.

Office Action for corresponding European Patent Application No. 09 812 741.8-1871, dated Jan. 19, 2017, 5 pages.

* cited by examiner

| LAYER | DATA IN RESULT OBJECT | EXAMPLE (MESSAGE) |
|---|---|---|
| DATA | UNSORTED SET OF DATA:<br>- DOCUMENT ID/LOCATION<br>- DATA OF OBJECT (I.E. MESSAGE CONTENTS, DIFFERENT FIELDS)<br>- DOCUMENT TYPE | MESSAGE ID: 12512<br>SENDER: KRISTIAN LUOMA <+358447126715><br>BODY: "I'LL HAVE TO WORK A BIT LATER TODAY, DON'T WAIT FOR ME. BR, KRISTIAN"<br>DATE/TIME: 18.01.2008 17:02:02 |
| INDEXED DATA | UNSORTED SET OF DATA:<br>- DOCUMENT ID/LOCATION<br>- TOKENIZED DATA: WORDS SEPARATED, FIELDS AND POSITIONS IN DOCUMENT REGISTERED<br>- DOCUMENT TYPE | MESSAGE ID: 12512<br>TYPE: SMS<br>WORDS: KRISTIAN (FIELD: "SENDER", POSITION: 0), LUOMA (FIELD: "SENDER", POSITION: 10), I (FIELD: "BODY", POSITION: 0), LL (FIELD:"BODY", POSITION: 2), .. ETC. |
| RESULT POOL (AFTER RESULTS PULLING, BEFORE RANK RESOLVING) | UNSORTED SET OF RESULTS MATCHING KEYWORD, CATEGORY AND FIELD OF QUERY:<br>DOCUMENT ID/LOCATION<br>DOC REPRESENTATION<br>- TITLE, DESCRIPTION)<br>MATCH DATA:<br>- AMOUNT OF MATCHES,TYPE OF MATCHES, ETC.<br>ACTIONABLE DATA:<br>- PHONENUMBERS, URLS, ETC.<br>DOCUMENT TYPE<br>SORT INFORMATION<br>- TIMESTAMP, LOCATION, DOMAIN, TITLE<br>OPTIONAL PAYLOAD:<br>- LIST OF ACTIONS TO BE PERFORMED<br>CONTEXT INFORMATION (SYSTEM PROVIDED) | QUERY: "KRIS", CATEGORY: SMS, FIELD: ANY<br>MESSAGE ID: 12512<br>TITLE: "I'LL HAVE TO WORK A BIT LATER TODAY, DON'T .."<br>DESCRIPTION: "KRISTIAN LUOMA"<br>TIMESTAMP: 18.01.2008 17:02:02<br>TYPE: SMS<br>AMOUNT OF MATCHES: 2<br>MATCHING FIELDS: BODY, SENDER<br>DOMAIN: IN-DEVICE |

*FIG. 3*

| LAYER | DATA IN RESULT OBJECT | EXAMPLE (MESSAGE) | |
|---|---|---|---|
| RESULT ACCESS (BEFORE SORTING) | GROUPED SET OF UNSORTED RESULT OBJECTS MATCHING KEYWORD, CATEGORY AND FIELD OF QUERY:<br>DOCUMENT ID/LOCATION<br>DOCUMENT REPRESENTATION<br>  - TITLE, DESCRIPTION<br>DOCUMENT TYPE<br>RANK VALUE<br>  - ONE INTEGER<br>SORT INFORMATION<br>  - TIMESTAMP, LOCATION, DOMAIN, TITLE<br>OPTIONAL PAYLOAD:<br>  - LIST OF ACTIONS TO BE PERFORMED | QUERY: "KRIS",<br>CATEGORY: SMS, FIELD: ANY<br>MESSAGE ID: 12512<br>TITLE: "I'LL HAVE TO WORK A BIT LATER TODAY, DON'T .."<br>DESCRIPTION: "KRISTIAN LUOMA"<br>TIMESTAMP: 18.01.2008 17:02:02<br>DOMAIN: IN-DEVICE | 502 |
| RESULT ACCESS (READY FOR DISPLAY) | GROUPED AND SET OF SORTED RESULT OBJECTS MATCHING KEYWORD, CATEGORY AND FIELD OF QUERY READY TO BE DISPLAYED:<br>DOCUMENT ID/LOCATION<br>DOCUMENT REPRESENTATION<br>  - TITLE, DESCRIPTION<br>DOCUMENT TYPE<br>OPTIONAL PAYLOAD:<br>  - LIST OF ACTIONS TO BE PERFORMED | QUERY: "KRIS", CATEGORY: SMS, FIELD: ANY<br>MESSAGE ID: 12512<br>TITLE: "I'LL HAVE TO WORK A BIT LATER TODAY, DON'T .."<br>DESCRIPTION: "KRISTIAN LUOMA"<br>TYPE: SMS | 504 |

*FIG. 5*

| RESULT X | RANK KEY | RANK METRIC | RANK WEIGHT | RANK PRODUCT |
|---|---|---|---|---|
| | MATCH QUALITY | K | A | K * A |
| | CONTENT CATEGORY | L | B | L * B |
| | CONTENT FIELD | M | C | M * C |
| | CONTENT DOMAIN | N | D | N * D |
| | MATCH COUNT | O | E | O * E |
| | LINK COUNT | P | F | P * F |
| | PROXIMITY | Q | G | Q * G |
| | FRESHNESS | R | H | R * H |
| | CONTEXTUAL VALUE | S | I | S * I |
| | HISTORY | T | J | T * J |
| | | | RANK: | (K*A)+(L*B)* (M*C)...*(T*J) |

*FIG. 7*

METHOD, SYSTEM, AND APPARATUS FOR ARRANGING CONTENT SEARCH RESULTS

CROSS REFERENCE TO RELATED APPLICATIONS

This application is a continuation of U.S. application Ser. No. 12/209,343 filed Sep. 12, 2008, which is incorporated herein by reference in its entirety.

FIELD OF THE INVENTION

This invention relates in general to computing devices, and more particularly to arranging content search results on computing devices.

BACKGROUND

Mobile computing devices are increasingly being adopted by mainstream users. The combination of easy portability, increasing network availability, and large local storage capabilities will result in mobile devices becoming the primary data repository for users. This use of mobile devices to carry the user's core data is a natural evolution of varied uses of previous generations of mobile devices. For example, cellular phones, media players, navigation devices, personal digital assistants (PDAs) and the like, were used to carry specialized data related to the device's primary function, e.g., contact data, music/video, maps and geographical data, notes, task lists, etc. Mobile devices have evolved that are capable of performing all of those functions on a single apparatus, and as a result the data related to those functions is also stored on the device.

As mobile devices have gained these various capabilities, the devices are called upon to access a wide variety of local and remote content. Local content may include any files stored on a device's persistent storage or directly accessible via a peripheral interface. Remote content may include data that is accessible via networks, including infrastructure or ad-hoc networks accessible in the home, office, and/or the Internet. As a result of the ubiquity of networking, many uses now blur the lines between local and remote content. For example, a music subscription service may offer music downloads and/or streaming, and be set up in such a way that the user need not know whether a currently playing song is locally stored or streaming over a network.

Even though there may be convergence between local and remote content for a given user application, the way that a user searches for such information may be still be configured to search for a particular type of data in a particular domain. This can lead to confusion in cases where the user is not particularly sure in which domain the target may reside. Further, such specialized searches may be inefficient, particularly in a reduced interface mobile device. Having to type in a query in different programs and in search contexts may be tiresome with a mobile input device. Similarly, trying to view and assimilate results on a small screen may be difficult.

SUMMARY

The present invention discloses a system, apparatus and method for arranging content searches. In one example embodiment, a method involves receiving a user-formulated search query via a user device. The search query is submitted to two or more search domains. The search domains represent separate data repositories accessible via the user device. Results objects are received from the two or more search domains in response to the search query. The results objects are ranked using different ranking criterion by the respective search domains from which the search results were received. A rank value for each of the results objects is determined based on a single ranking criterion. The results objects are ordered based at least partly on the rank values determined using the single ranking criterion. The results objects are sent for display in a user interface of the user device.

In more particular embodiments, at least one of the different ranking criterion and single ranking criterion account for a context of the user device when determining the rank value for each of the results objects. In such a case, the context may include at least one of time, location, and mobile data services associated with the user device. Also in such a case, accounting for the context of the user device may involve using the context differently to adjust the rank values depending on the domain from which each of the search results originated.

In other more particular embodiments, two or more search domains may include a first domain of local content stored on the user device, and a second domain of remote content accessible via a network. In another configuration, ordering the results objects for display in the user interface involves grouping a subset of the results objects based on similarities between members of the subset. In such a case, the similarities between the members of the subset may include any combination of a physical proximity between data objects represented by the members of the subset and a temporal proximity between data objects represented by the members of the subset.

In other more particular embodiments, at least one of the different ranking criterion may include a plurality of ranking keys that are combined into a single ranking value. In such a case, at least one of the different ranking criterion may further include a plurality of weights each assigned to the plurality of ranking keys, and the plurality of weights are applied to the respective ones of the plurality of ranking keys before combining the ranking keys into the single ranking value. In another variation of this case, the search results are ordered for display in the user interface based on a view definition selected from two or more view definitions. Each of the two or more view definitions may be associated with different sets of weights applicable to the plurality of ranking keys, and the plurality of weights can be applied to the respective ones of the plurality of ranking keys is associated with the selected view definition. In such a case, the method may further involve updating the plurality of ranking keys in response to an over-the-air update of the user device.

In other more particular embodiments, an apparatus includes one or more data interfaces capable of accessing separate data repositories and a user interface capable of receiving user inputs. A processor is coupled to the data interface and the user interface. Memory is coupled to the processor and includes instructions that cause the processor to receive a search query via the user interface and submit the search query to two or more search domains that represent the separate data repositories. The processor receives results objects from the two or more search domains in response to the search query. The results objects are ranked using different ranking criterion by the respective search domains from which the search results were received. The processor determines a rank value for each of the results objects based on a single ranking criterion, and orders the results objects based at least partly on the rank values determined using the single ranking criterion. The ordered results are sent for display in the user interface.

In other more particular embodiments, a computer-readable storage medium includes instructions which are executable by an apparatus for performing steps that include: a) receiving a search query via a user interface; b) submitting the search query to two or more search domains that represent the separate data repositories; c) receiving results objects from the two or more search domains in response to the search query, wherein the results objects are ranked using different ranking criterion by the respective search domains from which the search results were received; d) determining a rank value for each of the results objects based on a single ranking criterion; e) ordering the results objects based at least partly on the rank values determined using the single ranking criterion; and f) sending the ordered results for rendering in the user interface.

In other more particular embodiments, an apparatus includes: a) means for receiving a search query via a user interface; b) means for submitting the search query to two or more search domains that represent separate data repositories; c) means for receiving results objects from the two or more search domains in response to the search query, wherein the results objects are ranked using different ranking criterion by the respective search domains from which the search results were received; d) means for determining a rank value for each of the results objects based on a single ranking criterion; e) means for ordering the results objects based at least partly on the rank values determined using the single ranking criterion; and f) means for rendering the ordered results in the user interface.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

FIGS. 3-5 are block diagrams illustrating an example of unified search processing according to an embodiment of the invention;

FIG. 7 is a block diagram illustrating rank determination according to an embodiment of the invention;

DETAILED DESCRIPTION OF EXAMPLE EMBODIMENTS OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present disclosure describes methods, systems, and apparatus that improves on-device and remote search results performed on a user operated device. An example of such a device includes a mobile device such as cellular phone, personal digital assistant, personal navigation device, portable Internet tablet, etc. The present description is directed to improvements in how the search process flow is conducted on the device after a user submits a query on a mobile device. In the various disclosed embodiments, a unified search process considers traditional factors such as text string matches, along with additional factors, such as context information of the device. The results of the unified search can merge several vertical domains (like web, images etc) a single, consistent view. The unified search process handles tasks such as information retrieval, indexing, applying context information and other parameters to rankings, rank combining, and sorting.

The unified search process performs ranking and sorting search results in an efficient manner that is enhanced by the process of contextual discovery. A hybrid search process handles information retrieval, ranking, rank combining and sorting tasks during content discovery process in a mobile device. This enables efficient and rich experience of contextual discovery in mobile devices to content in the device, internet and other domains. Also, architectures and processes are scalable to multiple domains, and contextual parameters can be applied in a generic manner to different domains.

Figure 1:
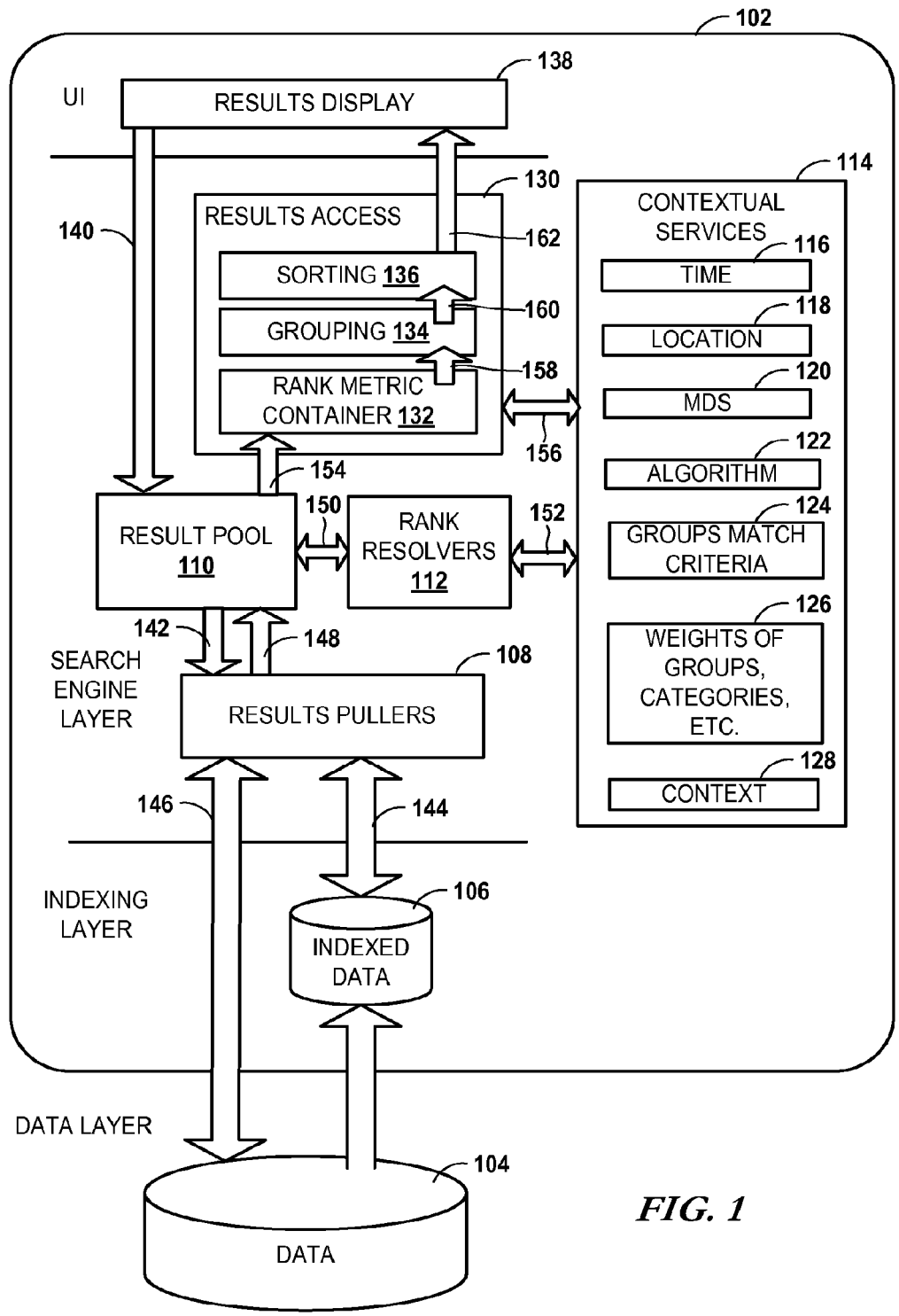
FIG. 1 is a block diagram illustrating a high-level architecture according to embodiments of the invention.

In FIG. 1, a block diagram shows a high-level architecture 102 that may be implemented in devices according to embodiments of the invention. The architecture includes components for searching one or more data repositories 104. These repositories 104 may be local or remote. For example, data may be accessed on repositories 104 using local or network filesystem protocols. The data of the repositories 104 may also be accessed using protocols not usually associated with filesystem access, such as Hypertext Transport Protocol (HTTP), File Transfer Protocol (FTP), streaming protocols, etc. Generally, where the data 104 is expected to be static or change infrequently, the data may be indexed and placed in an index database 106.

In the field of data search, indexing generally refers to analyzing data of the repositories 104 and placing representative data of the repositories 104 into an index 106 that allows much faster searching and retrieval than would occur if the repositories 104 had to be searched for every query. In the illustrated architecture, a results puller component 108 can retrieve results from the index 106 on demand and/or directly from the repositories 104. In some cases, the repositories 104 themselves may be indexed, thus possibly precluding the need to locally index the data. This may occur, for example, where the repositories 104 include an Internet search engine or a search engine running on a personal device (e.g., network attached storage device).

The data from the results puller 108 can be placed in a results pool 110. The data in the results pool 110 may include abbreviated/indexed data that is resolved from external and internal data sources. This resolved data of the results pool 110 may be annotated with metadata that further helps refine search results. This metadata added by a rank resolver component 112 that assists in ranking results for particular searches. The data added by the rank resolver 112 can help decides an ordering of the search results based on the characteristics of the query and data inherent in the results pool data 110 (e.g., text within a document). Other factors considered by the rank resolver 112 when generating data may include current context, as represented by contextual services 114.

The contextual services 114 may include one or more components that monitor various factors related to a current context of the device, and therefore by extension, of the user. Examples of context services 114 include time 116, location 118, available metadata systems (MDS) 120 (e.g., system-wide utilities that provide a uniform way to access content metadata), available ranking algorithms 122, criteria 124 related to groups (e.g., hierarchical, similarity, or other grouping of data, etc.). Each of the context services 114 may be assigned a static or dynamic weighting 126 that affects the results. Such weightings 126 may themselves be affected by context, e.g., if only a low bandwidth data connection is available, weightings 126 may favor results objects that are smaller or otherwise consume less bandwidth.

The above examples of contextual services 114 is only representative. Many other contextual factors may be considered, as represented by generic context 128. Such context 128 may include device states (e.g., low-power states, battery levels, active connections, current user), environment (e.g., temperature, weather, elevation, velocity, acceleration) and user data (e.g., age, schedule, presence, language, gender, nationality, user or computer group membership). The contextual services 114 may be used by both the results pool 110 and a results access component 130 that provides ranked results to a user. The results access component 130 includes components 132, 134, and 136 that respectively determine rank metrics, group results, and sort results. The final results are then sent to a display 138.

In order to better facilitate an understanding of the architecture 102, an example procedure is discussed that makes reference to various data communication paths in FIG. 1. In this scenario, a search query 140 is sent from the user interface 138 to the results pool 110. The query 140 may include criteria such as keyword, field match definitions, document/data type, etc. This query 140 may result in an instruction 142 being sent to the results pullers 108 to perform information retrieval. Matches from indexed data 106 and online services (not shown) are resolved 144 by the results pullers 108. In addition, the results pullers 108 may resolve 146 representation and required meta-data for rank resolving from native databases 104 for on-device content. The result of these resolving steps 144, 146, is that the result pool 110 is populated 148 with the resolved data that is tagged with the proper metadata. The results pool 110 is also populated 150 by the rank resolvers 112 using result-puller-fed tags to create new tags (e.g., rank metrics). The rank resolvers 112 may create new tags based on access 152 to available context service information 114.

Based on these inputs 148, 150, 152, the results pool sends rank-combined results 154 to the rank metrics container 132 which takes inputs 156 from the contextual services 114 and outputs 158 a combined rank metric for the results. The grouping component 134 groups the results and sends 160 grouped results to the sorting component 136. The sorting component 136 sort results within defined groups. The grouped and sorted results 162 are then sent to display 138.

It will be appreciated that the example sequence described above is merely exemplary, and many variations are possible. For example, search results that have already been obtained by previous searches or automatic indexing may be cached by components such as the results pool 110 for later access. Similarly, other data that affects ranking (e.g., determined by rank resolvers 112) may be retained with and/or associated with search results as long as relevant factors (e.g., current context) do not change.

Figure 2:
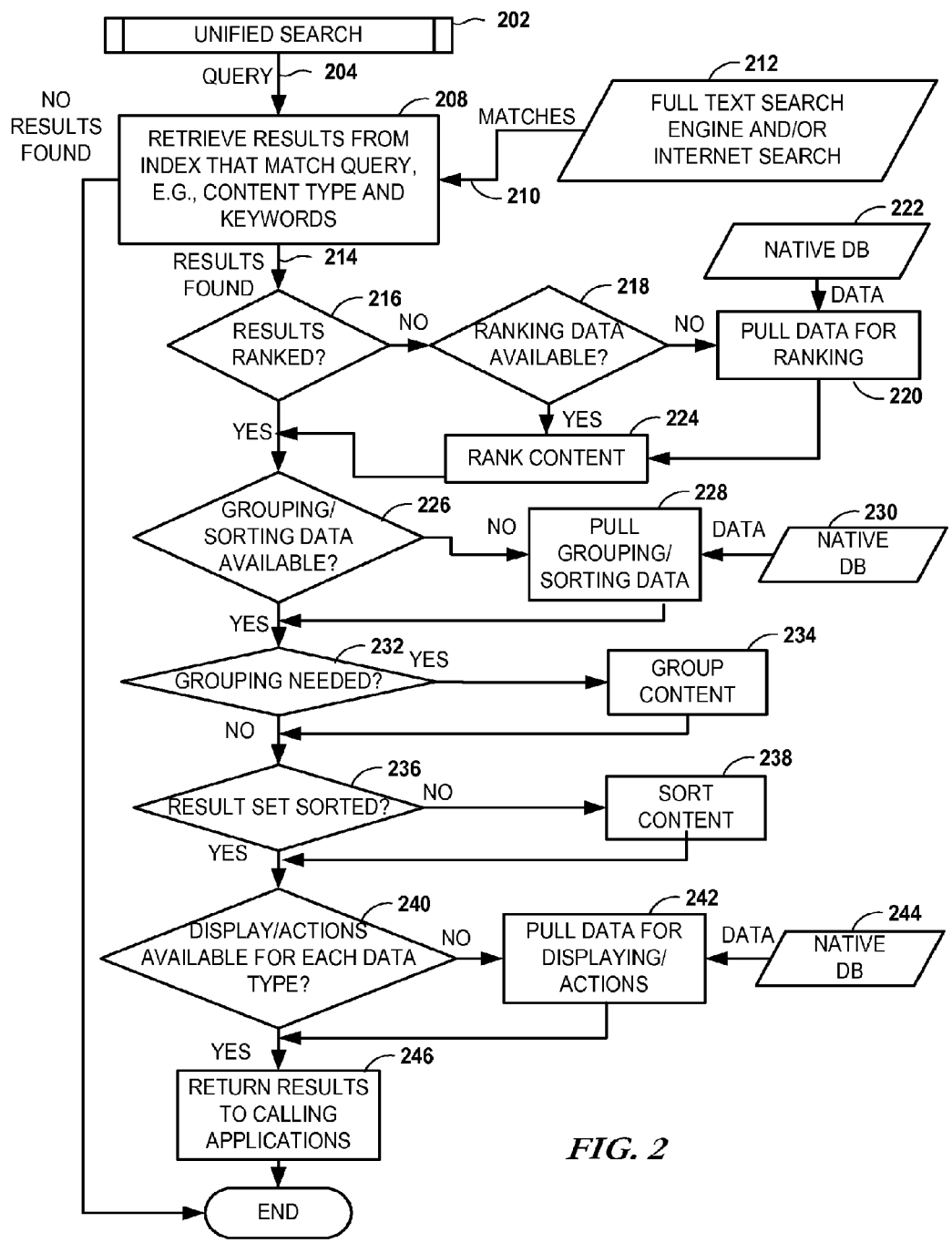
FIG. 2 is a flowchart illustrating a procedure for unified search according to an embodiment of the invention.

In reference now to FIG. 2, a flowchart illustrates additional details of a search process 202 according to an embodiment of the invention. In response to a query 204, results are retrieved 208. The retrieval 208 may involve pulling matches 210 from data sources 212 which may include a full-text search engine and/or Internet search. If results are found (indicated by path 214) then a check 216 is made to see if the results have already been ranked.

Assuming the results have not been ranked, a check 218 is made to determine whether ranking data is available. The ranking data may include metadata associated with a particular content object (e.g., file, address) that may not necessarily be considered in the initial search and indexing. For example, a modification date may be of value in ranking results, even though the date might not be analyzed when performing string searches in response to a text-based query. If the ranking data is determined 218 to be unavailable, it can be pulled 220 from one or more native databases 222. Thereafter, each result object is ranked 224, which may involve assigning one or more ranking values to the object. The ranking value is one consideration when presenting the results to the user, as will be described in greater detail below.

After content is ranked 224, it is determined 226 whether grouping and sorting data is available. The grouping and sorting data can affect display of search results based on other factors besides ranking. For example, if a relationship between objects is detected (e.g., hierarchical, inheritance) then it may be desirable to group the objects in the display, even if some of the grouped objects have lower ranking than other objects of the group. If grouping/sorting data is not available, then the grouping/sorting data is pulled 228 from a native database 230. If it is determined 232 that grouping is needed, then the results can be grouped 234, e.g., by generating data that defines group membership and relationships and associating this data with the results. Grouping the data 234 may also involve arranging the order of results in a container (e.g., linked list, array).

After grouping 232, 234, it is determined 236 whether the result set is correctly sorted, and sorting 238 occurs if not. Finally, the results may include one or more display attributes and selection actions associated with a data type of the target data objects. This data may be made available when the results are retrieved 208. If it is determined 240 that no display/action attributes are available for each data type, then the display/action attributes may be pulled 242 from the appropriate database 244. The results are now ready to be returned 246 to the calling application for display to the user.

Figure 4:
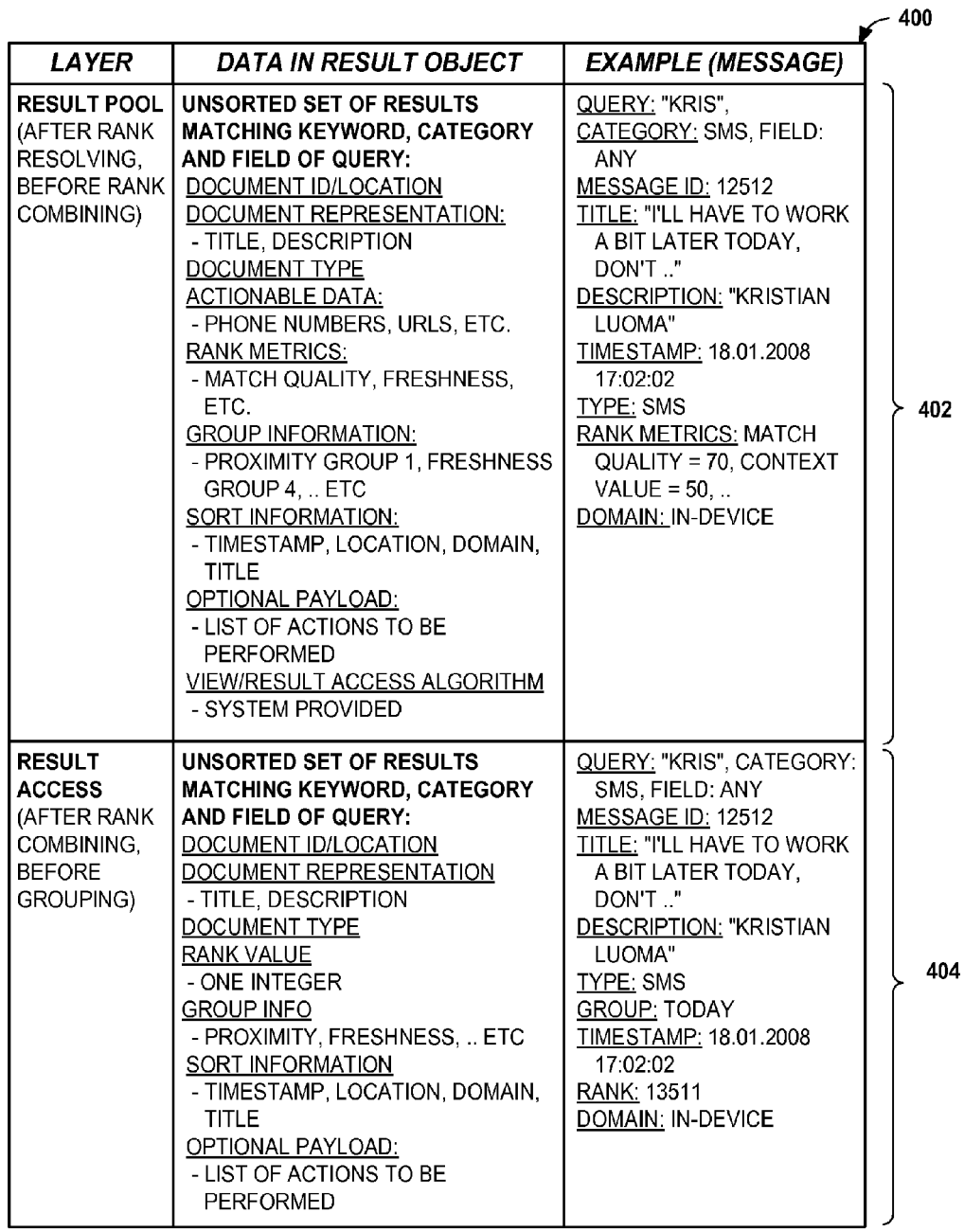

An example of how the various steps above may be applied to search targets to obtain search results is illustrated in tables 300, 400, and 500 of FIGS. 3-5. Using table 300 in FIG. 3 as an example, this table has three columns 302, 304, and 306. The first column 306 indicates at which layer of the architecture (see, e.g., architecture 102 in FIG. 1) the data is being processed/analyzed. The second column 304 indicates example data attributes that are identified and processed in each processing layer. The third column 306 shows how the processing may be applied to a concrete example of a data object, in particular a short message service (SMS) message.

The first row 308 of table 300 illustrates the state of data in the data layer. In this layer, the data exists in a format defined by the file system, database, or other persistent storage arrangement. An example of such data includes access identifiers (e.g., file name/location), core data contained in the object, and other system metadata (e.g., document type, dates created/accessed/modified). In the next row 310, indexing has been performed. The indexing may retain identifiers and other metadata, and breaks down at least the content into tokens that can be individually referenced in searches. The indexing may also be applied to metadata that is embedded in the data or added by file system or database. For example, music files may include text data (e.g., title, album, artist) embedded with the binary music data, and some file systems or databases may also allow such data to be externally associated with the content (e.g., file system metadata or database tables). This metadata can be indexed instead of or with the content data.

The indexing may also involve creating a standardized representation of metadata that is generic to all data types. For example, an author of an electronic book and artist of a song might be generically referred to as "creators." Thus data from respective "author" and "artist" fields may be moved to "creator" field of the indexed metadata. Because metadata may be associated with the respective source data objects in different ways (e.g., embedded in binary data, embedded in textual content, contained in filesystem metadata), therefore a use of common data paradigm (e.g., data field or database table) may be used to represent the creator for both data objects in the indexes.

In the next row 312 in table 300, the data is shown as it might be viewed at and/or stored by a results pool. In this stage 312, a query has been formed and applied to the indexed data and optionally the metadata. The result is a standardized representation of the metadata, indicators of total matches, and indicators of applicable data/metadata where the matches occurred. Other data may also generated/pulled, such as actionable data, actions that may be performed on actionable data, sort information, and context information. Note that at this stage 312, only the various raw data related to the matching process is considered. How this data is analyzed, including determining quality indicators for rank resolving, is discussed in relation to table 400 in FIG. 4.

In row 402 of table 400, the results pool data is shown after rank resolving is performed, but before rank combining. The data calculated at this stage 402 includes rank metrics (e.g., match quality, freshness), group information (which may be related to aspects of rank metrics), and view/result access algorithms. Thereafter, the results are passed to the results access layer as seen in row 404. Row 404 shows the data after rank combining, which involves combing the various rank metrics into a single number that can be numerically compared to other results. In this step, the grouping is applied to the results access layer as further seen in table 500 FIG. 5. In row 502 of table 500, the results objects are grouped and can now be sorted based on rank value and sort information. The grouped and sorted results are now ready for display as seen in row 504.

The ranking process described above can use any combination of ranking algorithms to come up with the single rank value that helps determines the final arrangement of search results. In the following section, particular algorithms are discussed for ranking search results of content within the device. There are a number of established ranking algorithms used in Web search (e.g., Google™ PageRank™). However, a ranking algorithm used for in-device search may need to consider different criteria than a web search engine. For example, in-device content can be highly varied, context information may be crucial, and many objects within the device can be interlinked with internal and external objects.

A ranking algorithm proposed herein relies on a list of ranking keys. A ranking key may generally be considered an aspect of the data, search, and/or environment that is looked at when determining total rank. Each ranking key is given a metric (M) and weight (W). The rank assigned to each result is $(M_1*W_1)+(M_2*W_2)+ \ldots +(M_n*W_n)$ for n ranking keys. The ranking key metric is calculated based on certain rules. The proposed approach is implemented to be flexible so that new ranking keys can be added in future. A generalization of the ranking procedure is shown below in Listing 1:

1. Identify all the relevant ranking keys for a search result
2. Apply the specific rules on a ranking key to generate the metric
3. Identify the weight for each ranking key
4. Multiply each ranking key metric with its weight (metric-weight value)
5. Add metric-weight values of all the ranking keys—this is the search rank of the result Listing 1

In determining the ranking, a number of keys may be examined. One of these keys is match quality. Match quality is related to identified string/data matches between a query and target data object, and reflects considerations such as whether the match is partial or exact, whether multiple keyword matches are in same or similar order as query, proximity of matches for multiple keyword queries, etc. Analyzing match quality may involve comparing the current search keyword(s) with the result item, and the rank resolver may assign a quality metric based on the match quality; e.g., 50% keyword match gives value 50, 100% match gives value 100. As an example, the keyword "Abb" is an exact (100%) match of "ABB", but a partial match of "ABBA" (75%) and "Abbie" (60%). A similar analysis may be performed for multiple keyword searches, e.g., examining full text segments containing all of the keywords and determining what percentage of the text segment is occupied by the search strings.

Another key that may be considered when determining ranking is content category. This may refer to data format and/or end use of particular objects. A consistent way to categorize content (e.g., graphics, text, multimedia, etc.) may be defined and different weights may be determined for different categories. During analysis, the assigned categories are mapped to respective weight and the rank resolver assigns metric value based on table of weights. In a particular search where the user is looking for a contact, a category such as "contacts" may be assigned a weight of 100, a category such as "email" or "messages" may be assigned a weight of 80, and a category such as "music" may be assigned a weight of 10. A single object may be assigned to more than one category. For example, an animated GIF file may be assigned to both graphics and multimedia, e.g., 80% graphics, 20% multimedia. This ratio may be variable based on how many animation frames are in the GIF file, e.g., more frames make the file resemble a video more than a static graphic. A similar analysis may be applied to conglomerate content objects (e.g., word processing document with an embedded video).

Another key, content field, may also allow finer granularity evaluation of content. In the example above where emails are considered when searching for a contacts category, the "To:" and "From:" address fields may be given a higher ranking than other fields of the email (e.g., title, body, routing headers). Different weights may be applied to different fields, and as with other criterion, the rank resolver assigns metric value based on table of weights.

In addition to content type, content domain may be another key that is important to consider when ranking search results. These domains may include geographic domains, such as "in-device," "in-home," "Internet," etc. Other domain sets may include "work/personal", "fixed/mobile", "Mac/PC", etc. The domain of a particular content is mapped to a weight depending on attributes and context of search, and the rank resolver assigns metric value based on table of weights. For example, for a particular search, "in-device" domain may receive a weight of 100, and domain of "home" may get a weight of 10.

Although similar to match quality, a gross tally of "hits" may be considered as a separate ranking key. Match count may include a measure of how many matches the object has for the keyword, without necessarily considering whether the matches are partial or exact. For example, if there are 10 matches in a object, the metric may be 10; if there is 1 match, the metric may be 1; and if there are 100 or more matches, the metric may be 100. Some adjustments to this ranking may be applied for search queries that include short, commonly used n-tuples, which are more likely to result in large numbers of full and partial matches.

Another key that may be considered when determining ranking is link count. The link count may be determined by counting how many links the content item has in the device (interlinking of objects). A background operation may search through the data of the device, analyzing the relations of different objects. Each link for an object adds to the value of the interlinked object. The output of this operation may be a graph showing relationships and counts of links between objects. Different category weights may need to be applied to links to achieve link quality analysis. For example, a link from "photos" may be more valuable than a link from "messages" in some situations. This metric may assign correlation between number of links and rank metric. For example, if there are 10 links to an object, the metric may be 10, and if there are no links to an object, the value may be zero.

The links need not be direct references to data objects of the same type, or even of objects that would identified in the search. The links may be references made to a common data point/object in different objects. For example, in search for photos of Berlin, a directory named "Berlin" may contain a photo, and an HTML file and email that both make reference to the same photo, using the term the "Berlin Landmark." Thus this photo would have a link count of 3 based on three associations between the photo and the word "Berlin." In another example, a contact item "Mikko Kankainen" occurs 50 times in a messages database, therefore contact record for Mikko Kankainen has link count of 50.

Access count is another key that may be relevant to the importance that a user places on a data object. Access count generally refers to the number of times that particular piece of content has been accessed from within the device or outside the device. This may be determined by an observer module that counts the accesses of the content. The access count may also be related to time of last access, which is usually tracked by filesystems and the like. A high access count may be used to increase or decrease ranking depending on how and when the data is accessed. For example, it may be assumed that if a user frequently accesses a particular file directly using the filesystem or an application, it is more likely the user is very familiar with this file and is less likely to be searching for it. In such a case, this type of high access count would be given a low value. On the other hand, if all of the tracked access events occur via the search engine interface, then it is more likely that search is the preferred mode of finding the object, and in such a case higher access count may lead to a higher ranking.

As described above, various search results may be grouped together based on some pre-determined relationship or similarity. A related concept is proximity, which a data object may be properly categorized into more than one group, but may be more strongly affiliated with some groups that with others. A proximity ranking key may define which group or groups of proximity would a result item belongs to. Such a concept may be highly applicable to metadata such as location, where distance from a fixed point can be objectively calculated and compared. This may be applicable to other types of groupings, particularly where the grouping criteria is "fuzzy;" e.g., allows for some relative measure of how strong group affiliation is.

A concept similar to proximity is freshness, which may be considered a measure of temporal distance. For example, if a result is in temporally defined group "today" it gets a metric of 100 depending on the search criteria (e.g., fresher content is better). If, using the same search criteria, the result is in group "next week" a freshness key may get a metric of 50, and if the result is in a group "last month" the key gets a metric of 10. Even though in this example, freshness relates to current time, it will be appreciated that a relative ranking may be applied using any point in time as the target from which freshness is determined.

One other key that may be considered when determining relevance is contextual value and history. One way of looking at this concept is to consider whether this action/result been accessed in this context before. Context may include historical pattern created from time of day, week day, location and other relevant information. A contextual engine may be used to map results consumption and contexts in the background when user is using the device. In such a case, if there is a contextual value for an object, the contextual key is mapped with value based on the accuracy in context (scale 0-100). So, if a result has been used in the context before, it gets a value of 100, otherwise a value of 10.

As described above, search results may be applied to different domains. The term "domain" may refer to any user-distinguishable partition of data sources, such as local/remote, static/dynamic, personal/business, etc. Users may partition their data and activities to occur in different domains for different reasons. For example, data may be stored remotely or locally based on such factors as access speed, privacy, security, ease of access, etc. In some cases, users may want to limit searches to particular domains. In other cases, users may wish for searches to span domains. Even so, in the latter case users may still desire for the results to reflect the domains in which the target data resides, such as by taking into account the domain when the ranking, grouping, and/or sorting results.

Figure 6:
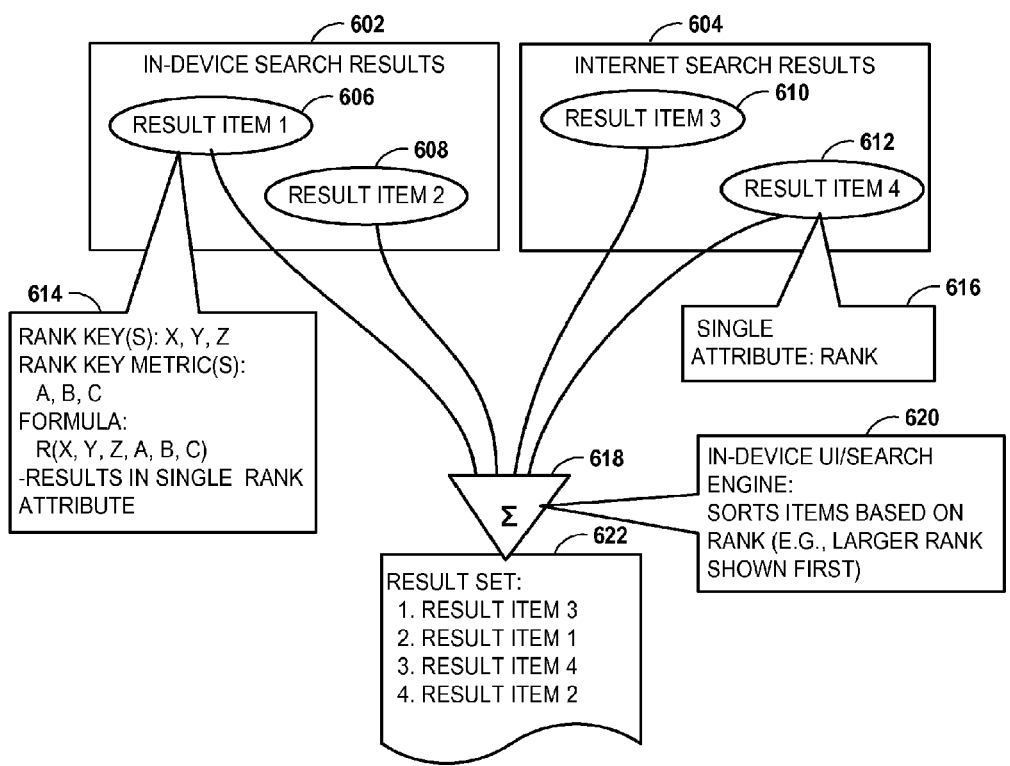
FIG. 6 is a block diagrams illustrating unified ranking from different domains according to an embodiment of the invention.

The following section describes the ranking metrics that may be combined for multiple data sources and domains. The ranking metrics are used to combine results during the search process in response to a query received from a user of a personal (e.g., mobile) device. The result items are presented in a unified manner, e.g., in a single list where results from multiple domains are blended based on their comparable relevancy. This enables combining of domain specified/calculated rank metrics of result items originating from multiple search domains. In FIG. 6, a block diagram illustrates aspects of multi-domain rank combining according to an embodiment of the invention.

In FIG. 6, two example domains 602, 604 are shown that represent respective in-device and Internet search targets. In response to a search request/query, result items 606, 608 are obtained from in-device domain 602, and result items 610, 612 are found in Internet domain 604. Results 606, 608 may utilize ranking key metrics, such that the resulting rank value is a function of the rank keys and their respective metrics as shown in block 614. In contrast, the Internet results 604 may include a single rank attribute as represented by block 616. It will be appreciated that if the search results 604 originate from an arbitrary (e.g., user selected) Internet search engine, then there may be incompatibilities between the rankings 614 of the in-device domain 602 and rankings 616 of the Internet domain. In some cases, the Internet-domain rank 616 may be reported by the search engine as an explicit ranking (e.g., 80% relevant) that may or may not closely correlate to the in-device-domain rankings 614. Alternatively, the only indication of the Internet domain rank 616 may be derived from the order the results 610, 612 are returned.

In order to better correlate the Internet-domain rankings 616 with the in-device-domain rankings 614, it may be necessary to at least obtain a ranking value of the Internet search domain 604 that may be translated to an appropriate scale (e.g., 0-100). Even if the search engine does not display such a rank value in the returned results, such value may be obtained in some cases. For example, the Internet search engine may embed ranking data in the HTML and/or make the data via a public Web services API. Where such data is lacking, the local search service may still attempt to derive its own ranking of the results 604. For example, if a set of five sorted results items are returned by the domain 604, a local search engine could independently rank the highest and lowest ordered result using similar criteria to the in-device search criteria 614, and interpolate rankings for the remaining results items.

However the various rankings 614, 616 are derived, a summation component 618 uses a sorting algorithm 620 to combine the results items 606, 608, 610, 612 into a single view 622. It will be appreciated that, even when results from domains 602, 604 are adjusted to contain compatible rank values, device context may be applied to those adjustments, or afterwards when results are combined 618. For example, if a terminal detects that the user is currently in Rome, queries directed to "Rome" may give higher weighting to the Internet domain 604 results than to general results on the in-device domain 602, as such data might be more current and detailed. However, because the local domain criteria 614 may include more accurate ranking criteria, such factors as freshness and relevancy may still ensure that recently gathered and relevant local data is appropriately ranked in this context.

Relevancy rules can be combined during a process of information retrieval from multiple domains with variable properties and data types. To perform rank combining and sorting within the search and discovery framework, a functional component may be implemented in the architecture. Such a functional component enables hybrid searches (e.g., between different search domains), and results from multiple content domains can be represented in uniform result containers. Advantages of such an implementation include multi-domain integration in a seamless manner and superior end-user experience during the information retrieval process.

In reference now to FIG. 7, a block diagram illustrates a sample implementation of a combining algorithm according to an embodiment of the invention. A number of example rank keys such as described above are shown in column 702. In column 704, a metric for each key is shown. Each rank metric is associated with a rank weight as shown in column 706. The associated rank metrics and weights are multiplied to form each rank product of column 708, and the summation of the rank products forms the final rank, as shown in cell 710.

In-device content may be ranked against multiple rank keys. In order to facilitate simple ordering of results and integration with external domains, the ranks are combined to one single metric that is comparable to the rank metrics of results obtained from other domains. In the device side, the combining of the rank metrics may be done after each of metrics for different rank keys are assigned. In such a case, the device will fill in the values column 704 during the gathering phase. The desired weights for the keys 702 may vary based on a view definition for a particular search. The view definition may define the desired weights for factoring in the ranking keys for each result item in respective category. Structurally, the view definition may appear as shown below in Listing 2.

---
Listing 2
---

```
<view id="root"
    layout="defaultViewLayout"
    possibleGrouping="alphabetical"
    relevancy="a,b,c,d,e,f,g,h,i,j">
</view>
Copyright © 2008, Nokia, Inc.
```
---

Figure 8:
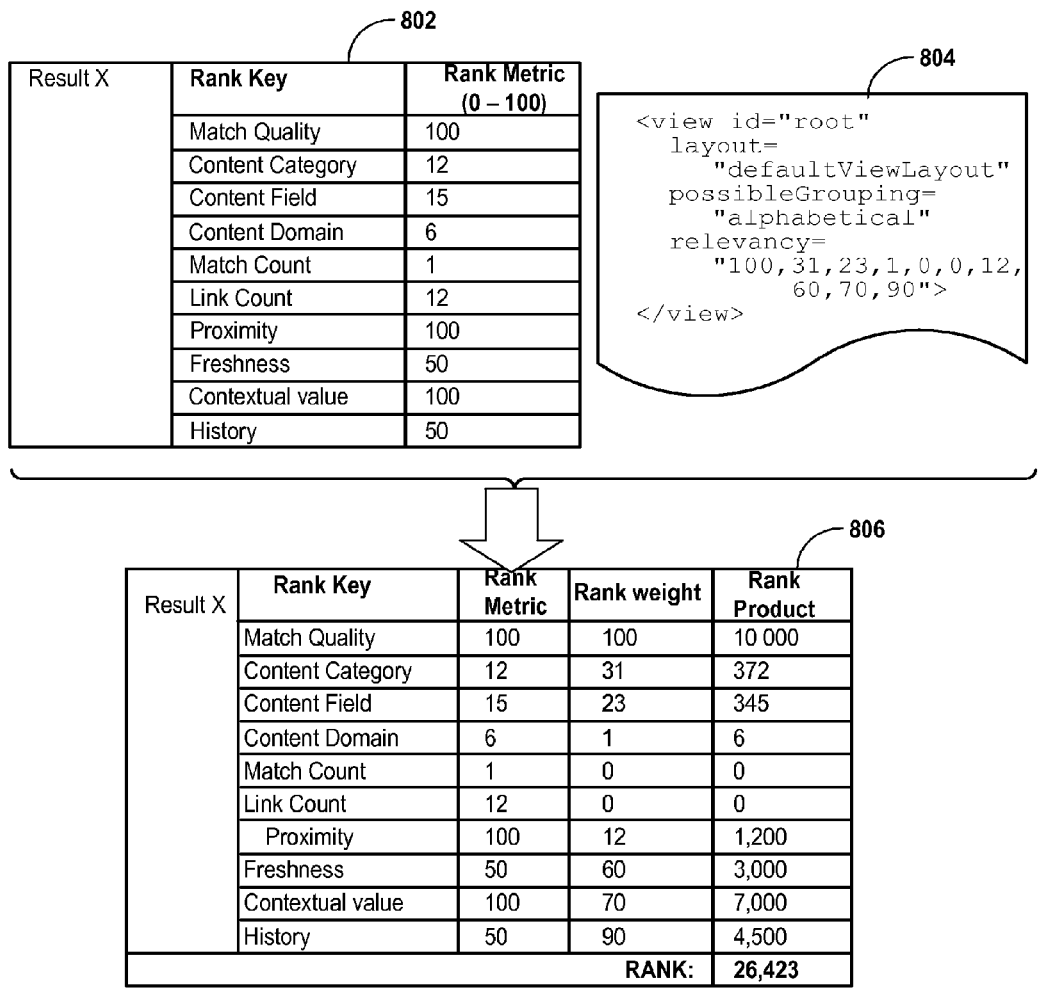
FIG. 8 is a block diagram illustrating an example rank determination using a view definition according to an embodiment of the invention.

The relevancy attribute (e.g., "a, b, c . . . ") in Listing 2 indicates the desired weighting value for each row in column 706. The weights in column 706 are applied to the results in column 704 after gathering the metrics 704 but before preparing a view of the results to the calling application. In such a way, the same results may appear differently depending on the chosen view definition. This is shown in FIG. 8, which is a block diagram illustrating a concrete application of a view definition to rank metrics according to an embodiment of the invention. For a particular result "X," a set of rank weights is gathered for each key as seen in table 802. This result ranking 802 is combined with a view definition document 804. The resulting ranks and weights are combined to obtain a single rank value as seen in table 806.

It will be appreciated that, due to the number of rank keys and weightings, a system according to an embodiment of the invention can be flexibly configured, finely adjusted, and updated. Adjustments to the ranking algorithm can be dynamically applied, and can alter characteristics or static properties of rank resolvers, such as group, domain, category, and field specific weights. Similarly, rank metric weights of view and result access components can be modified adjusted on a system wide basis as well as a per-view basis. For mobile devices, updating the logic may be taken care of as a part of the standard over-the-air (OTA) update procedures of the device.

Figure 9:
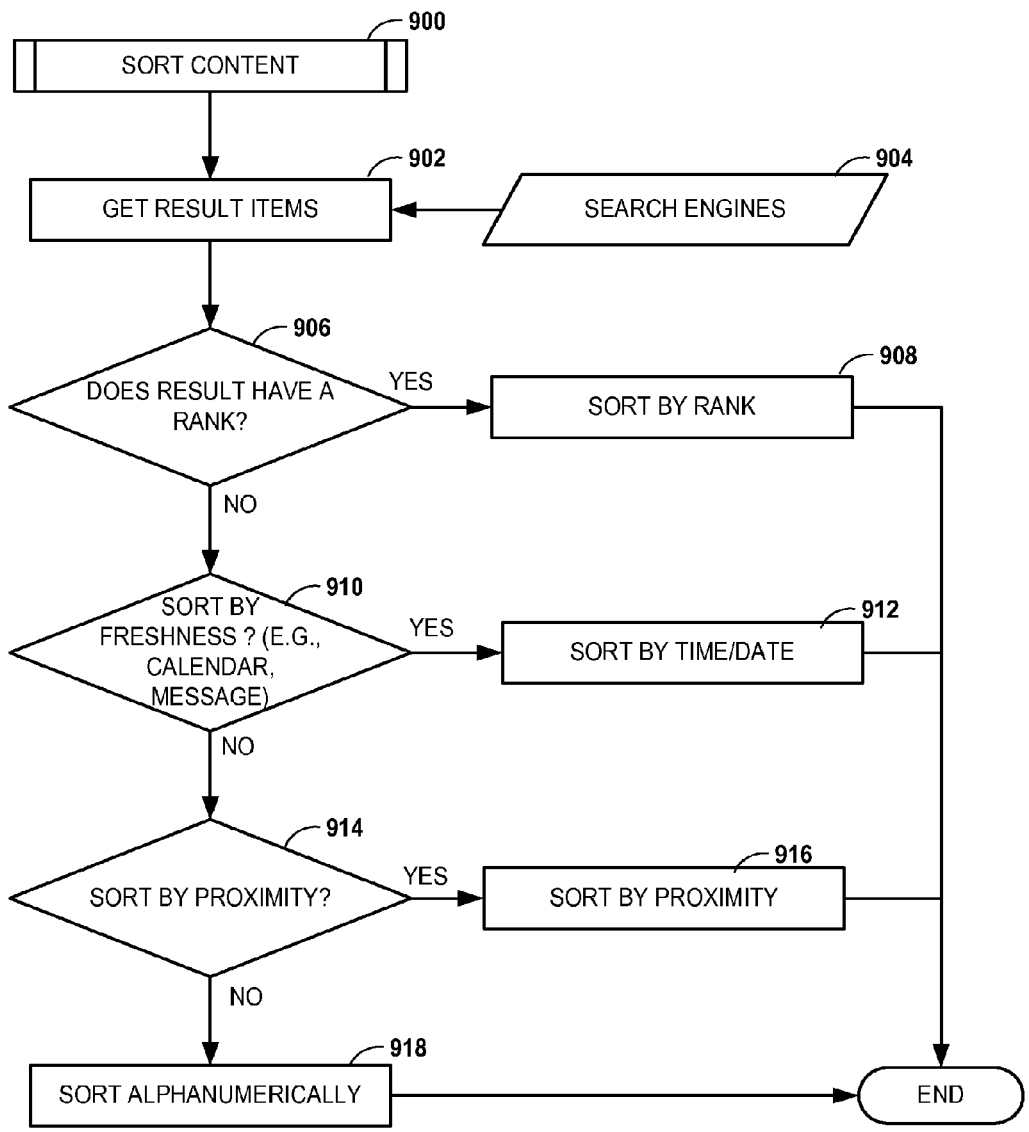
FIG. 9 is a flowchart illustrating a ranking procedure according to an embodiment of the invention.

In reference now to FIG. 9, a flowchart illustrates a procedure 900 for sorting results according to one embodiment of the invention. In this example, the sorting component gets 902 a set of results items from one or more search engines 904. If it is determined 906 that the results have a rank associated with them, then sorting by rank 908 is performed. If not, then determinations 910, 914 may be made to sort by freshness (e.g., time) and/or proximity 916. If none of these are applicable, an alphanumeric sort 918 may be performed.

It will be appreciated that many variations on this procedure 900 are possible. For example, the ordering of the various determinations 906, 910, 914 may be altered, e.g., by user preference, thereby affecting the resulting sorting action 908, 912, 916, 918. Further, a system may provide multiple sorts on a single set of data. For example, two or more results having the same rank may be ordered relative to each other based on freshness and/or proximity.

Many types of apparatuses may be used for search operations as described herein. Mobile telephony devices are particularly useful for personal search because such devices are increasingly becoming a primary repository for important personal information. In reference now to FIG. 10, an example is illustrated of a representative mobile computing arrangement 1000 capable of carrying out operations in accordance with embodiments of the invention. Those skilled in the art will appreciate that the exemplary mobile computing arrangement 1000 is merely representative of general functions that may be associated with such mobile devices, and also that landline computing systems similarly include computing circuitry to perform such operations.

The processing unit 1002 controls the basic functions of the arrangement 1000. Those functions associated may be included as instructions stored in a program storage/memory 1004. In one embodiment of the invention, the program modules associated with the storage/memory 1004 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 1000 via data signals, such as being downloaded electronically via one or more networks, such as the Internet and an intermediate wireless network(s).

The mobile computing arrangement 1000 may include hardware and software components coupled to the processing/control unit 1002 for performing network data exchanges. The mobile computing arrangement 1000 may include multiple network interfaces for maintaining any combination of wired or wireless data connections. In particular, the illustrated mobile computing arrangement 1000 includes wireless data transmission circuitry for performing network data exchanges.

This wireless circuitry includes a digital signal processor (DSP) 1006 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 1008, generally coupled to an antenna 1010, transmits the outgoing radio signals 1012 and receives the incoming radio signals 1014 associated with the wireless device. These components may enable the arrangement 1000 to join in one or more networks 1015, including mobile service provider networks, local networks, and public networks such as the Internet.

The mobile computing arrangement 1000 may also include an alternate network/data interface 1016 coupled to the processing/control unit 1002. The alternate network/data interface 1016 may include the ability to communicate via secondary data paths using any manner of data transmission medium, including wired and wireless mediums. Examples of alternate network/data interfaces 1016 include USB, Bluetooth, Ethernet, 1002.11 Wi-Fi, IRDA, Ultra Wide Band, WiBree, etc. These alternate interfaces 1016 may also be capable of communicating via the networks 1015, or via direct peer-to-peer communications links.

The processor 1002 is also coupled to user-interface elements 1018 associated with the mobile terminal. The user-interface 1018 of the mobile terminal may include, for example, a display 1020 such as a liquid crystal display and a transducer 1022. The transducer 1022 may include any sensing device capable of producing media, such as any combination of text, still pictures, video, sound, etc. Other user-interface mechanisms may be included in the interface 1018, such as keypads, speakers, microphones, voice commands, switches, touch pad/screen, graphical user interface using a pointing device, trackball, joystick, vibration generators, etc. These and other user-interface components are coupled to the processor 1002 as is known in the art.

The program storage/memory 1004 typically includes operating systems for carrying out functions and applications associated with functions on the mobile computing arrangement 1000. The program storage 1004 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 1004 of the mobile computing arrangement 1000 may also include software modules for performing functions according to embodiments of the present invention.

In particular, the program storage/memory 1004 includes a search engine component 1024 that is configured to receive queries from and/or provide search results to a plurality of user interface clients 1026. The clients 1026 are generally user programs capable of interacting via the user interface 1018. The clients 1026 may be particular to search, and/or may include other types of applications, such as telephony, messaging, video, media playback, navigation, productivity, contacts, calendaring, content creation, etc. The search engine 1024 includes a domain access interface 1028 that is capable of searching one or more data domains, represented here by respective local and remote repositories 1030, 1032. The latter domain 1032 may be accessed as known in the art using a network interface 1034.

The search engine 1024 may have directed access to indexed data as represented by indexing interface 1036. The indexing interface 1036 may provide access to pre-tokenized data and metadata of repositories 1030, 1032. The search engine 1024 access the indexed or un-indexed data in response to a query that may be submitted via clients 1026. The search engine 1024 may determine a number of objects that satisfy the query, and use the data 1030, 1032 along with contextual services 1038 and other native databases to rank, group, and sort the results. The results may be displayed in UI clients 1026 via a generic view definition architecture that enables flexible definition of views by the use of view definition documents 1040. The view definition documents 1040 may include XML-formatted documents that allow flexible rendering of search access, query, and results UIs.

Figure 10:
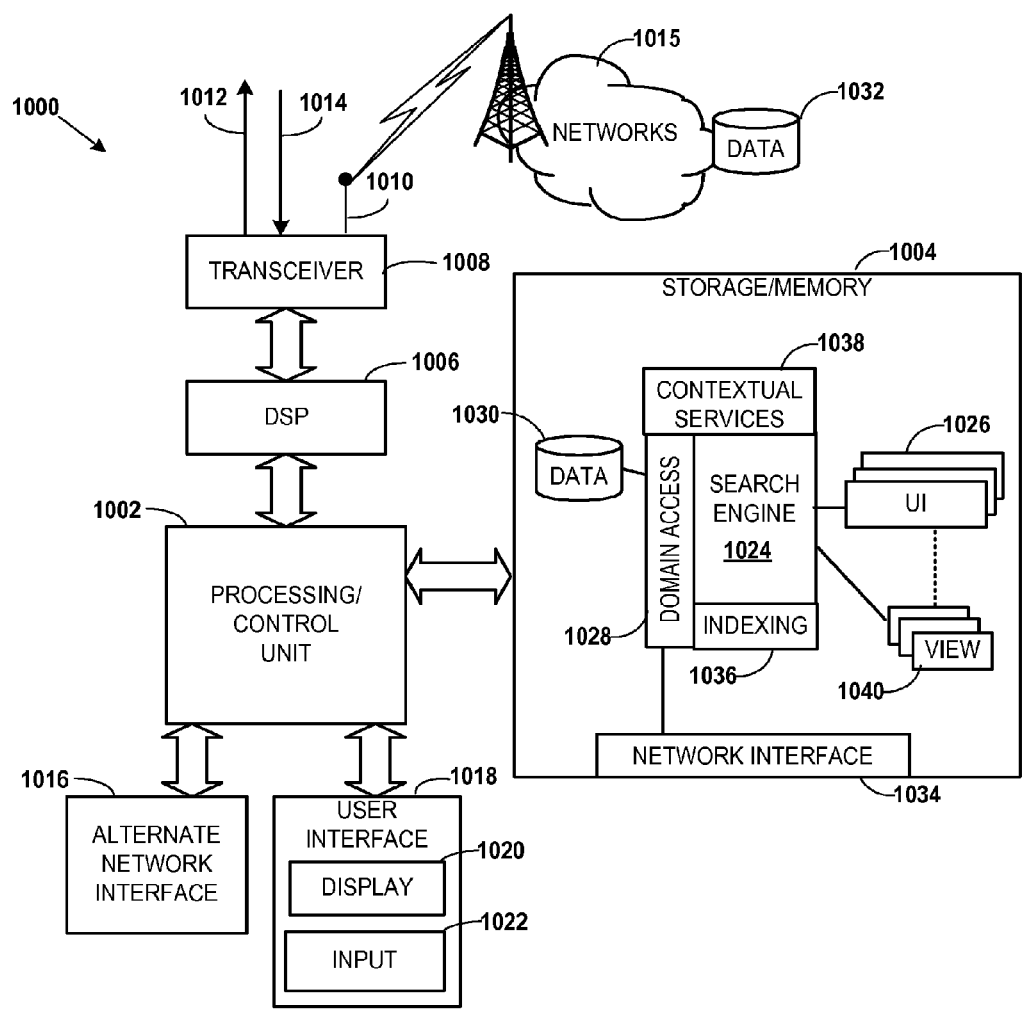
FIG. 10 is a block diagram of a mobile device according to an embodiment of the invention.

The mobile computing arrangement 1000 of FIG. 10 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Figure 11:
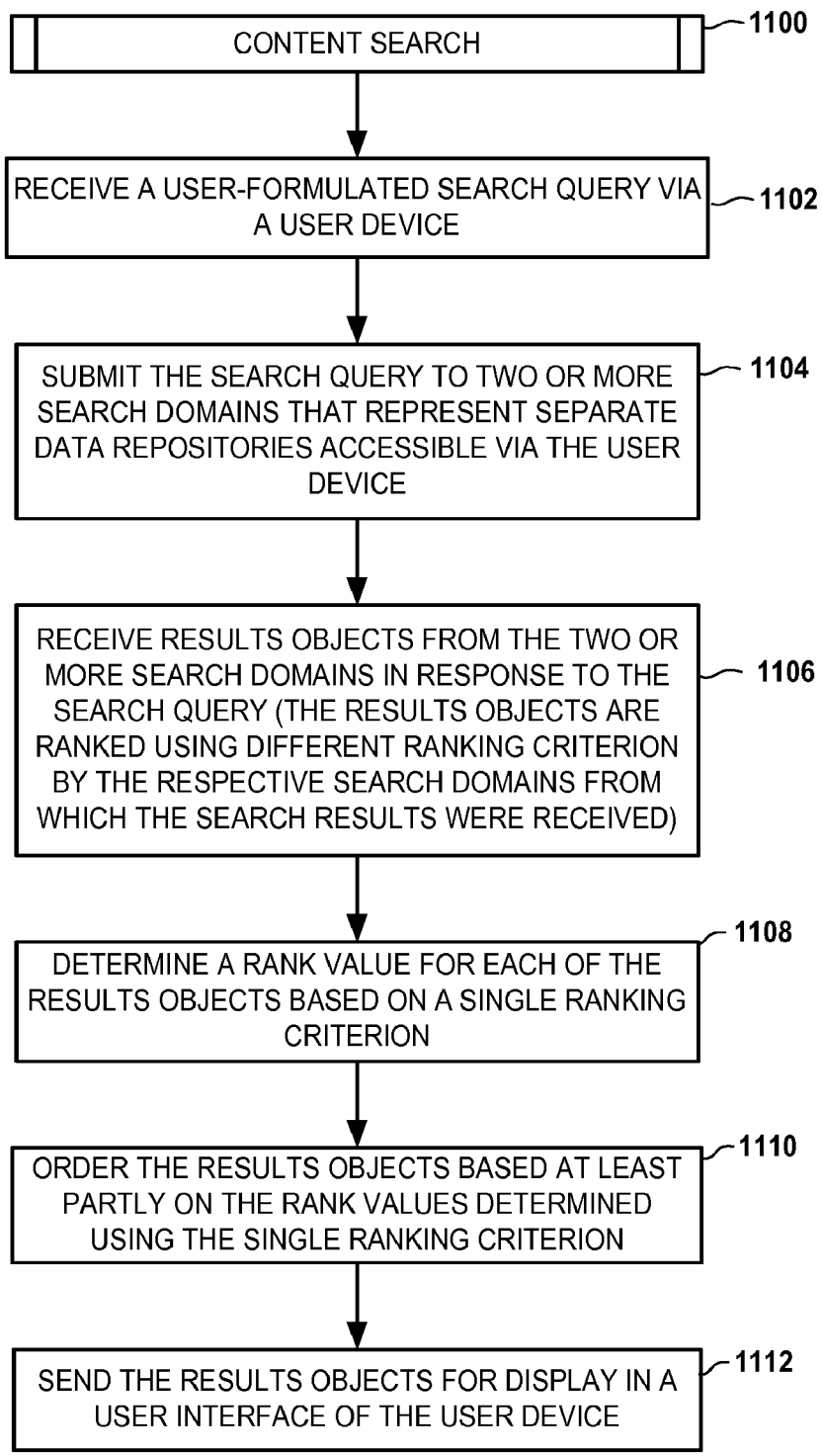
FIG. 11 is a flowchart illustrating a procedure according to an embodiment of the invention.

In reference now to FIG. 11, a flowchart illustrates a procedure 1100 according to one embodiment of the invention. The procedure 1100 involves receiving 1102 a user-formulated search query via a user device. The search query is submitted 1104 to two or more search domains. The search domains represent separate data repositories accessible via the user device. Results objects are received 1106 from the two or more search domains in response to the search query. The results objects are ranked using different ranking criterion by the respective search domains from which the search results were received. A rank value for each of the results objects is determined 1108 based on a single ranking criterion. The results objects are ordered 1110 (e.g., arranged sorted, grouped) based on the rank values determined using the single ranking criterion and sent 1112 for display in a user interface of the user device.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method for rendering arranged content search results, the method comprising:
    causing via a processor of a user device, at least in part, a rendering of a plurality of result objects in a single view in a user interface of the user device, the rendering of the plurality of result objects comprising:
        causing, at least in part, tracking of access events associated with a plurality of the result objects,
            wherein the plurality of the result objects are from a plurality of search domains,
            wherein the tracking of access events comprises tracking a number of times that one or more of the plurality of result objects has been accessed to develop a tracking history for the one or more of the plurality of result objects,
            wherein the tracking of access events further comprises tracking a number of times that the one or more of the plurality of result objects has been accessed from a first domain of local content stored on the user device and/or from a second domain of remote content accessible via a network;
        causing, at least in part, determining a context of the user device during the tracking of the access events;
        causing, at least in part, mapping of the determined context of the user device associated with the tracked access events;
        causing, at least in part, determining a rank value for the respective result objects based, at least in part, on the mapping and the tracking history of the respective result objects;
        causing, at least in part, a sorting of the ranked result objects according to the determined rank value; and
        rendering, at least in part, the sorted ranked result objects in the single view in the user interface of the user device.

2. The method of claim 1, wherein the context comprises at least one of time, location, and mobile data services associated with the user device.

3. The method of claim 1, wherein a contextual engine maps the context of the user device to the tracked access events.

4. The method of claim 1, wherein the determined rank value of a result object is based, at least in part, on one or more of at least one rank metric, group information, a view/result access algorithm, or a combination thereof associated with the result object.

5. The method of claim 1, wherein the improvement comprises providing a rendering of ranked and sorted result objects from multiple domains that is enhanced by a process including contextual considerations.

6. The method of claim 1, wherein determining a rank value for a result object is further based, at least in part, on a weighting value.

7. The method of claim 1, wherein the result objects are ordered for display in the user interface based on a view definition selected from two or more view definitions.

8. The method of claim 7, wherein ordering the result objects for display in the user interface comprises causing, at least in part, grouping a subset of the results objects based on similarities between members of the subset.

9. The method of claim 1, wherein the context is determined by a context determining engine.

10. An apparatus for rendering arranged content search results, the apparatus comprising:
    at least one processor of a user device; and
    at least one memory including computer program code for one or more programs,
    the at least one memory and the computer program code configured to, with the at least one processor of the user device, cause the apparatus to perform at least the following:
    cause, at least in part, a rendering of a plurality of result objects in a single view in a user interface of the user device, the rendering of the plurality of result objects comprising:
        cause, at least in part, tracking of access events associated with a plurality of the result objects,
            wherein the plurality of the result objects are from a plurality of search domains,
            wherein the tracking of access events comprises tracking a number of times that one or more of the plurality of result objects has been accessed to develop a tracking history for the one or more of the plurality of result objects,
            wherein the tracking of access events further comprises tracking a number of times that the one or more of the plurality of result objects has been accessed from a first domain of local content stored on the user device and/or from a second domain of remote content accessible via a network;
        cause, at least in part, determining a context of the user device during the tracking of the access events;

cause, at least in part, mapping of the determined context of the user device associated with the tracked access events;

cause, at least in part, determining a rank value for the respective result objects based, at least in part, on the mapping and the tracking history of the respective result objects;

cause, at least in part, a sorting of the ranked result objects according to the determined rank value; and render, at least in part, the sorted ranked result objects in the single view in the user interface of the user device.

11. The apparatus of claim 10, wherein the context comprises at least one of time, location, and mobile data services associated with the user device.

12. The apparatus of claim 10, wherein a contextual engine maps the context of the user device to the tracked access events.

13. The apparatus of claim 10, wherein the determined rank value of a result object is based, at least in part, on one or more of at least one rank metric, group information, a view/result access algorithm, or a combination thereof associated with the result object.

14. The apparatus of claim 10, wherein the improvement comprises providing a rendering of ranked and sorted result objects from multiple domains that is enhanced by a process including contextual considerations.

15. The apparatus of claim 10, wherein determining a rank value for a result object is further based, at least in part, on a weighting value.

16. The apparatus of claim 10, wherein the result objects are ordered for display in the user interface based on a view definition selected from two or more view definitions.

17. A non-transitory computer-readable storage medium carrying one or more sequences of one or more instructions which, when executed by one or more processors, cause an apparatus to at least perform the following steps for rendering arranged content search results:

causing, at least in part, a rendering of a plurality of result objects in a single view in a user interface of the user device, the rendering of the plurality of result objects comprising:

causing, at least in part, tracking of access events associated with a plurality of the result objects, wherein the plurality of the result objects are from a plurality of search domains, wherein the tracking of access events comprises tracking a number of times that one or more of the plurality of result objects has been accessed to develop a tracking history for the one or more of the plurality of result objects, wherein the tracking of access events further comprises tracking a number of times that the one or more of the plurality of result objects has been accessed from a first domain of local content stored on the user device and/or from a second domain of remote content accessible via a network;

causing, at least in part, determining a context of the user device during the tracking of the access events;

causing, at least in part, mapping of the determined context of the user device associated with the tracked access events;

causing, at least in part, determining a rank value for the respective result objects based, at least in part, on the mapping and the tracking history of the respective result objects;

causing, at least in part, a sorting of the ranked result objects according to the determined rank value; and rendering, at least in part, the sorted ranked result objects in the single view in the user interface of the user device.

18. The non-transitory computer-readable storage medium of claim 17, wherein the context comprises at least one of time, location, and mobile data services associated with the user device.

19. The non-transitory computer-readable storage medium of claim 17, wherein a contextual engine maps the context of the user device to the tracked access events.

20. The non-transitory computer-readable storage medium of claim 17, wherein the determined rank value of a result object is based, at least in part, on one or more of at least one rank metric, group information, a view/result access algorithm, or a combination thereof associated with the result object.

21. The non-transitory computer-readable storage medium of claim 16, wherein the improvement comprises providing a rendering of ranked and sorted result objects from multiple domains that is enhanced by a process including contextual considerations.

* * * * *